Figure 1:
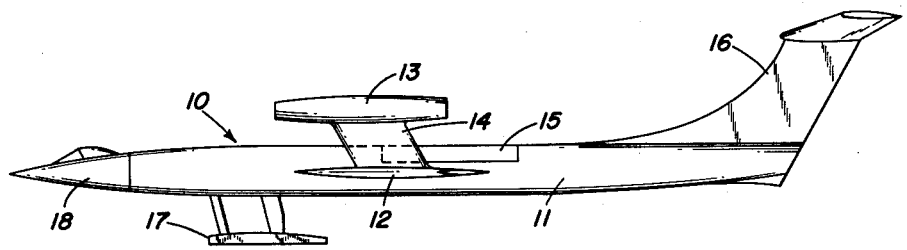

Nov. 21, 1961     F. W. S. LOCKE, JR     3,009,669

SUPERSONIC AIRPLANE CONFIGURATION

Filed June 29, 1956

Inventor
FREDERICK W. S. LOCKE, JR.

United States Patent Office 3,009,669
Patented Nov. 21, 1961

3,009,669
SUPERSONIC AIRPLANE CONFIGURATION
Frederick W. S. Locke, Jr., Arlington, Va., assignor to the United States of America as represented by the Secretary of the Navy
Filed June 29, 1956, Ser. No. 595,018
4 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

The present invention relates to a supersonic airplane configuration and more particularly to a supersonic airplane in which a rotatable crew compartment is housed in the nose of the airplane.

In the design of a transonic or supersonic seaplane for bombing or mine laying missions, it has been found that if the fuselage has a small enough cross-sectional area to make supersonic flight probable, the location available for the jet engines leads to the expectation that they will be seriously affected by spray during take-off and landing. Further, there is an increasing desire for capability to operate such seaplanes in rougher seas than has heretofore been the practice, which operation additionally jeopardizes the jet engines from spray, and imposes additional loads on the structure. The location of the bomb bay or mine bay in the bottom of the seaplane subjects this cargo to intense loads, thereby necessitating an increase in the weight and complexity of the seaplane. The solution of increasing the hull height in order to elevate the engines to provide spray clearance has been unacceptable because the airplane simply will not be supersonic because the aerodynamic drag would be too high with such configuration. Further, this solution in no way alleviates the difficult structural, water tightness and loading problems attendant upon a seaplane having a bomb bay or mine bay in the bottom of the hull.

In view of the above, an object of the present invention is the provision of a seaplane configuration wherein the engines are so placed that there will be little if any danger from spray damage during landing and take-off.

Another object is to provide a seaplane in which the problems of bomb bay door structural integrity, water tightness and accessibility are overcome.

A further object of the invention is the provision of an airplane configuration in which the cross sectional area of the airplane is such that supersonic flight may be attained.

Still another object is to provide a seaplane configuration in which the engines will be below the wing during normal flight.

Figure 2:
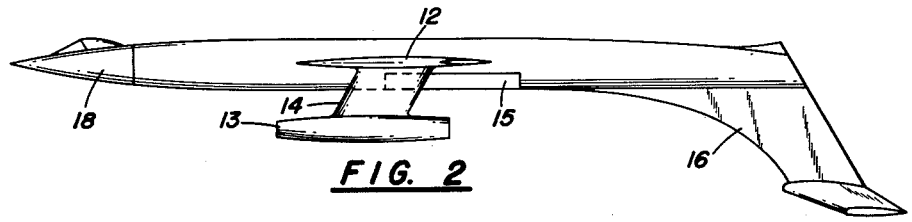
Figures 3, 4:
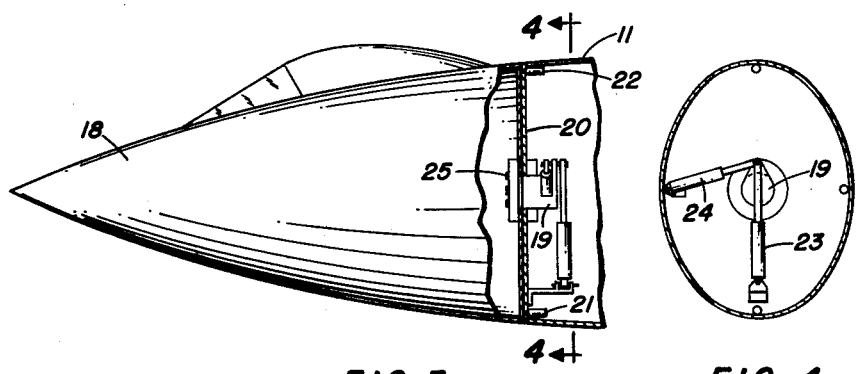

Other objects and many of the attendant advantages of this invention will be readily appreciated as the same becomes better understood by reference to the following detailed description when considered in connection with the accompanying drawings wherein:

FIG. 1 is an elevational view of a seaplane in accordance with the present invention in landing or take-off position, FIG. 2 is an elevational view of the seaplane of FIG. 1 in in-flight postion, FIG. 3 is an enlarged view of the nose section of the seaplane of the invention, and FIG. 4 is a sectional view taken on the line 4—4 of FIG. 3.

Referring now to the drawings wherein like reference characters designate like or corresponding parts throughout the several views, there is shown in FIG. 1 (which illustrates a preferred embodiment) an airplane 10 having a fuselage 11 from which wings 12 protrude on either side. Engines 13 are supported on pylons 14 extending from the wings 12. A bomb bay door 15 is shown in the upper part of the fuselage, as viewed in FIG. 1, and a T-tail 16 extends upwardly from the fuselage, in FIG. 1. Hydro-skis or hydro-foils 17 are carried by the fuselage 11, although, if desired, the fuselage 11 may be of the more conventional seaplane hull type. A rotatable nose section 18 is carried at the forward end of the fuselage.

FIG. 2 shows the airplane according to the present invention in the in-flight position, in which the fuselage 11 has been rotated 180° about the longitudinal axis of the airplane. This brings the T-tail 16 into the inverted position, and places the bomb bay door 15 on the bottom side of the fuselage, as well as places the engines 13 below the wing 12.

In FIG. 3 there is shown the nose section 18 of the airplane 10 pivotally mounted to the fuselage 11 by means of a trunnion 19 extending through a forward bulkhead 20 of the fuselage 11. Hydraulic locking pins 21, 22 are provided to releasably lock the nose section 18 to the fuselage 11. As best shown in FIG. 4, a pair of hydraulic cylinders 23, 24 are pivotally mounted in the fuselage 11 and act on the trunnion 19. Preferably, explosive bolts 25 are associated with the trunnion 19, for a purpose to be hereinafter more fully described.

In operation, the seaplane 10 will have mines or bombs loaded into it through the upwardly facing doors 15, as from a tender or the like. Upon take-off the airplane 10 will ride on the hydro-foil or hydro-skis 17, and the engines 13 will be safely above the spray. In addition, the T-tail 16 will extend upwardly above the water. Upon attaining a pre-selected altitude and speed, the pilot will invert the airplane, as by rolling it over, and then will lock in autopilot, disengage the controls, and then invert the cockpit so that the crew is again in an upright position. Thereafter the pilot will engage the controls and finally will disengage the autopilot. Rotation of the cockpit nose section 18 will be accomplished by the hydraulic cylinders 23 and 24 causing rotation of the cockpit nose section 18 on the trunnion 19. Controls from the cockpit 18 into the remainder of the aircraft may be affected either by hydraulic or electric lines, in which case looped hydraulic or electric lines or slip rings could be used to permit the necessary 180° rotation. If necessary, detonation of the explosive bolts 25 would free the cockpit nose section 18 from the remainder of the aircraft in the event such action was necessary, whereupon the nose section 18 would be an escape capsule.

On approaching a landing, the inverting procedures above outlined will be repeated, and the aircraft will land in the position in which it took off, shown in FIG. 1.

For bombing from the inverted position, if high speed bombing is necessary, ejectors may be provided for the bombs or mines in order to permit them to clear the tail 16. Alternatively T-tail 16 may be replaced by an inverted V-tail, so that the bombs or mines will pass between the two parts thereof.

Obivously many modifications and variations of the present invention are possible in the light of the above teachings. It is therefore to be understood that within the scope of the appended claims the invention may be practiced otherwise than as specifically described.

What is claimed is:

1. In an aircraft, a fuselage applicable to use in a first attitude for takeoff, landing and subsonic flight and to use in a second attitude for supersonic flight, a cabin crew compartment rotatably mounted on the forward end of said fuselage, means adapted to rotate said cabin crew compartment 180° relative to said fuselage about the longitudinal axis thereof to right said cabin crew compartment after rotating the aircraft to the first or second fuselage attitude, sustaining means consisting of only two wings supported on said fuselage and extending horizontally outward from opposite sides thereof in either the first or second fuselage attitude, engines fixedly supported by said wings whereby said engines are located above said wings in the first fuselage attitude and below said wings in the second fuselage attitude, tail surfaces supported on said fuselage extending upward from said fuselage in the first fuselage attitude and depending from said fuselage in the second fuselage attitude.

2. In an aircraft, a fuselage applicable to use in a first attitude for takeoff, landing and subsonic flight and to use in a second attitude for supersonic flight, a cabin crew compartment rotatably mounted on the forward end of said fuselage, means adapted to rotate said cabin crew compartment 180° relative to said fuselage about the longitudinal axis thereof to right said cabin crew compartment after rotating the aircraft to the first or second fuselage attitude, sustaining means consisting of only two wings supported on said fuselage and extending horizontally outward from opposite sides thereof in either the first or second fuselage attitude, tail surfaces supported on said fuselage extending upward from said fuselage in the first fuselage attitude and depending from said fuselage in the second fuselage attitude.

3. In an aircraft, a fuselage applicable to use in a first attitude for takeoff, landing and subsonic flight and to use in a second attitude for supersonic flight, a cabin crew compartment rotatably mounted on the forward end of said fuselage, means adapted to rotate said cabin crew compartment 180° relative to said fuselage about the longitudinal axis thereof to right said cabin crew compartment after rotating the aircraft to the first or second fuselage attitude, sustaining means consisting of only two wings supported on said fuselage and extending horizontally outward from opposite sides thereof in either the first or second fuselage attitude, engines fixedly supported by said wings whereby said engines are located above and ahead of said wings in the first fuselage attitude and below and ahead of said wings in the second fuselage attitude, a first tail surface supported on said fuselage, a second tail surface supported by said first tail surface and extending in a direction perpendicular thereto, the first tail surface extending vertically upward from the supporting fuselage with the second tail surface located horizontally above the fuselage in the first fuselage attitude and the first tail surface extending vertically downward from the fuselage with the second tail surface located horizontally below the fuselage when in the second fuselage attitude.

4. In an aircraft, a fuselage applicable to use in a first attitude for takeoff, landing and subsonic flight and to use in a second attitude for supersonic flight, a cabin crew compartment rotatably mounted on the forward end of said fuselage, means adapted to rotate said cabin crew compartment 180° relative to said fuselage about the longitudinal axis thereof to right said cabin crew compartment after rotating the aircraft to the first or second fuselage attitude, sustaining means consisting of only two wings supported on said fuselage and extending horizontally outward from opposite sides thereof in either the first or second fuselage attitude, engines fixedly supported by said wings whereby said engines are located above and ahead of said wings in the first fuselage attitude and below and ahead of said wings in the second fuselage attitude, a first tail surface supported on said fuselage, a second tail surface supported by said first tail surface and extending in a direction perpendicular thereto, the first tail surface extending vertically upward from the supporting fuselage wtih the second tail surface located horizontally above the fuselage in the first fuselage attitude and the first tail surface extending vertically downward from the fuselage with the second tail surface located horizontally below the fuselage when in the second fuselage attitude, a bomb bay having bomb bay doors in said fuselage located as to be on the upper side of the fuselage in the first fuselage attitude and on the lower side of the fuselage when in the second fuselage attitude.

References Cited in the file of this patent

UNITED STATES PATENTS 2,774,556    Robert _____ Dec. 18, 1956